(12) United States Patent
Brownlee et al.

(10) Patent No.: US 7,920,796 B2
(45) Date of Patent: Apr. 5, 2011

(54) DQPSK TRANSMITTER WITH PARALLEL PRECODER AND HIGH-SPEED DQPSK DATA STREAM REALIGNMENT

(75) Inventors: John Brownlee, Atlanta, GA (US); Boris Kershteyn, Marietta, GA (US)

(73) Assignee: Ciena Corporation, Linthicum, MD (US)

( * ) Notice: Subject to any disclaimer, the term of this patent is extended or adjusted under 35 U.S.C. 154(b) by 902 days.

(21) Appl. No.: 11/839,466

(22) Filed: Aug. 15, 2007

(65) Prior Publication Data
US 2009/0022492 A1 Jan. 22, 2009

Related U.S. Application Data

(60) Provisional application No. 60/950,032, filed on Jul. 16, 2007.

(51) Int. Cl.
*H04B 10/04* (2006.01)
(52) U.S. Cl. ........ 398/188; 398/183; 398/192; 398/193; 398/194; 398/195; 375/308; 375/354; 375/355; 385/24; 385/15
(58) Field of Classification Search ................ 398/182, 398/183, 188, 190, 192, 207, 208, 158, 81, 398/159, 155, 154, 43, 184, 185, 186, 187, 398/189, 191, 193, 194, 195, 196, 197, 198; 375/308, 354, 355, 346, 316; 385/24, 15
See application file for complete search history.

(56) References Cited

U.S. PATENT DOCUMENTS

| | | | | |
|---|---|---|---|---|
| 7,555,061 | B2 * | 6/2009 | Katagiri et al. | ............... 375/308 |
| 7,689,133 | B2 * | 3/2010 | Katagiri et al. | ............... 398/204 |
| 2002/0124030 | A1 | 9/2002 | Enam et al. | |
| 2003/0043434 | A1 | 3/2003 | Brachmann et al. | |
| 2005/0074245 | A1 * | 4/2005 | Griffin | ............... 398/188 |
| 2006/0193399 | A1 | 8/2006 | Katagiri et al. | |
| 2006/0269294 | A1 | 11/2006 | Kikuchi | |
| 2008/0118246 | A1 * | 5/2008 | Steidl et al. | ............... 398/98 |

OTHER PUBLICATIONS

Yoshiaki Konishi, Kazuyuki Ishida, Kazuo Kubo and Takashi Mizuochi; True PRBS Transmission DQPSK by Differential Precoder Employing Parallel Prefix Network; Information Technology R&D Center, Mitsubishi Electric Corporation 5-1-1, Ofuna Kamakura Japan; (c) 2006 Optical Society of America.

M. Serbay, C. Wree and W. Rosenkranz; Implementation of differential precoder for high-speed optical DQPSK transmission; Electronics Letters; Sep. 30, 2004; vol. 40 No. 20.

Written Opinion of the International Searching Authority (Form PCT/ISA/237); PCT Application No. PCT/US08/72861; Jun. 18, 2009.

International Search Report and Written Opinion of the International Searching Authority (Form PCT/ISA/220); PCT Application No. PCT/US08/72861; Jun. 18, 2009.

* cited by examiner

*Primary Examiner* — Hanh Phan
(74) *Attorney, Agent, or Firm* — Clements Bernard PLLC; Chistopher L. Bernard; Tyler S. Brown

(57) ABSTRACT

The present invention utilizes field programmable gate arrays (FPGAs) to implement a parallel differential quadrature phase shift keying (DQPSK) precoder and a DQPSK optical transmitter with an automatic realignment process. The present invention can perform DQPSK preceding, modulation, and data stream realignment at any lower rate, and its upper rate is determined by capability in speed and logic resources and external connections of available integrated circuit technology.

19 Claims, 5 Drawing Sheets

DQPSK TRANSMITTER WITH PARALLEL PRECODER AND HIGH-SPEED DQPSK DATA STREAM REALIGNMENT

CROSS-REFERENCE TO RELATED APPLICATION(S)

The present non-provisional patent application claims priority to U.S. Provisional Patent Application Ser. No. 60/950,032, filed Jul. 16, 2007, and entitled "SYSTEMS AND METHODS FOR HIGH-SPEED DQPSK DATA STREAM REALIGNMENT AND ASSOCIATED HIGH-SPEED INTERFACES FOR INFINIBAND AND ETHERNET," which is incorporated in full by reference herein.

FIELD OF THE INVENTION

The present invention relates generally to high-speed optical communication systems, such as 100 Gigabit-per-second (100G) systems. More specifically, the present invention relates to systems and methods utilizing field programmable gate arrays (FPGAs) to implement a parallel Differential Quadrature Phase Shift Keying (DQPSK) precoder.

BACKGROUND OF THE INVENTION

High-speed optical communication systems are moving towards advanced modulation formats to improve transmission properties, e.g. optical reach, dispersion tolerance, spectral efficiency, and the like. In Phase Shift Keying (PSK) modulation, the phase of a carrier is modulated. Quadrature Phase Shift Keying (QPSK) utilizes four phase levels for modulation. Conventional direct-detection optical receivers cannot detect optical phase, but can detect phase differences between adjacent bits by converting these phase differences into power changes. As such, optical communication systems utilize Differential Phase Shift Keying (DPSK) and Differential Quadrature Phase Shift Keying (DQPSK).

For operational DQPSK transmission systems, both with a Return-to-Zero (RZ) and Non-Return-to-Zero (NRZ) pulse shape, a differential quaternary precoder is required in the transmitter. The precoder circuit is configured to map input information onto the four phase states, i.e. the precoder converts input data to a format susceptible for the DQPSK format. Automatic realignment of two streams of data into a DQPSK optical modulator is required for high data rates, such as 100 Gb/s. Serial DQPSK precoders are known in the art, and this approach has been tested at 10 Gb/s.

However, serial precoders are too expensive, and difficult to impossible to build for high-speed rates up to 100 Gb/s and beyond. It is extremely difficult to synchronize both data using discrete gates and flip-flops at data rates higher than 40 Gb/s. It is close to impossible to control propagation delay in discrete logic and cables.

Also, for operational DQPSK transmission systems, data stream alignment is critical to ensure a phase lock between independent data streams that are combined during the DQPSK modulation process. Conventional realignment processes utilize serial data and the realignment is done by selecting cable length and phase shifters. However, such conventional processes are inapplicable to high-speed, parallel systems, such as DQPSK systems operating at high-speed rates (e.g. 50 Gb/s, etc.). DQPSK transmission systems are limited by the absences of automatic realignment processes.

BRIEF SUMMARY OF THE INVENTION

In various exemplary embodiments, the present invention utilizes field programmable gate arrays (FPGAs) to implement a parallel differential quadrature phase shift keying (DQPSK) precoder and a DQPSK optical transmitter with an automatic realignment process. The present invention can perform DQPSK precoding, modulation, and data stream realignment at any lower rate, and its upper rate is determined by capability in speed and logic resources and external connections of available integrated circuit technology.

In an exemplary embodiment, the present invention utilizes two or three FPGAs to perform parallel precoding. Two high-speed FPGAs with high-speed input/output (I/O) interfaces are configured to accept synchronized independent data, such as in a SerDes Framer Interface Level 5 (SFI-5) format. One of the high-speed FPGAs, or optionally a third FPGA, is configured to perform encoding and synchronization for DQPSK modulation.

The present invention includes a DQPSK optical transmitter equipped with the parallel precoder and a realignment circuit. The realignment circuit includes fanouts or output pick-offs from modulator drivers fed into an Exclusive OR (XOR) phase detector. The XOR phase detector drives a realignment circuit configured to adjust independent data streams from the precoder to ensure a phase lock. Advantageously, the present invention utilizes readily available FPGA logic, and does not require high-speed circuitry, such as greater than 40 GHz. Further, the precoder can be compact in size. The present invention utilizes a parallel format and readily available multiplexers, such as 16:1 multiplexers.

In an exemplary embodiment of the present invention, a parallel precoder circuit includes precoding circuitry configured to process a first and second high-speed data stream, a first FPGA including a first high-speed input/output interface, a second FPGA including a second high-speed input/output interface, a first and second multiplexer, and a clock unit. The first FPGA is configured to receive the first high-speed data stream, process the first high-speed data stream to a lower rate, transmit the first high-speed data stream to the precoding circuitry, receive the processed first high-speed data stream, and transmit the processed first high-speed data stream to the first multiplexer. The second FPGA is configured to receive the second high-speed data stream, process the second high-speed data stream to a lower rate, transmit the second high-speed data stream to the precoding circuitry, receive the processed second high-speed data stream, and transmit the processed second high-speed data stream to the second multiplexer. The first and second high-speed data streams are encoded and synchronized for a DQPSK modulation format. Optionally, the precoding circuitry includes a third FPGA connected to the first and second FPGAs through a parallel interface. Alternatively, the precoding circuitry is located within the first FPGA, and wherein the second FPGA is connected to the first FPGA tirough a parallel interface.

In another exemplary embodiment of the present invention, a DQPSK optical transmitter includes a parallel precoder configured to receive a first and second high-speed data stream, and to encode and synchronize the first and second high-speed data stream for DQPSK modulation; an alignment circuit configured to receive the precoded first and second high-speed data stream streams from the parallel precoder; a first and second multiplexer, wherein the first multiplexer is configured to receive the first precoded high-speed data stream from the alignment circuit, and the second multiplexer is configured to receive the second precoded high-speed data stream from the alignment circuit; a first and second DQPSK modulator driver, wherein the first DQPSK modulator driver is configured to receive the first multiplexed high-speed data stream, and the second DQPSK modulator driver is configured to receive the second multiplexed high-speed data stream; and a DQPSK modulator configured to modulate an optical signal responsive to outputs from the first and second DQPSK modulator drivers. The alignment circuit is configured to phase lock the first and second high-speed data streams.

In another exemplary embodiment of the present invention, a parallel precoding and high-speed data stream realignment method for a DQPSK optical transmitter includes receiving a first and second high-speed data stream, processing the first and second high-speed data streams to a lower rate, encoding the first and second high-speed data streams, synchronizing the first and second high-speed data streams, serializing the first and second high-speed data streams, monitoring phase differences between the serialized first and second high-speed data streams, and adjusting one of the first and second high-speed data streams responsive to phase differences to achieve a phase lock between the serialized first and second high-speed data streams.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention utilizes field programmable gate arrays (FPGAs) to implement a parallel differential quadrature phase shift keying (DQPSK) precoder and a DQPSK optical transmitter with an automatic realignment process. In an exemplary embodiment, the present invention utilizes two or three FPGAs to perform parallel precoding. Two high-speed FPGAs with high-speed input/output (I/O) interfaces are configured to accept synchronized independent data, such as in a SerDes Framer Interface Level 5 (SFI-5) format. One of the high-speed FPGAs, or optionally a third FPGA, is configured to perform encoding and synchronization for DQPSK modulation.

Each high-speed FPGA accepts multiple line width of data including a deskew channel, processes them to a lower data rate, propagates the data to a third FPGA for encoding and synchronization, and then outputs the data, such as in an SFI-5 format. Optionally, the one of the three FPGAs can be eliminated if the other two FPGAs have enough processing capability. The present invention can perform DQPSK precoding, modulation, and data stream realignment at any lower rate, and its upper rate is determined by capability in speed and logic resources and external connections of available integrated circuit technology.

The present invention includes a DQPSK optical transmitter equipped with the parallel precoder and a realignment circuit. The realignment circuit includes fanouts or output pick-offs from modulator drivers fed into an Exclusive OR (XOR) phase detector. The XOR phase detector drives a realignment circuit configured to adjust independent data streams from the precoder to ensure a phase lock. Advantageously, the present invention utilizes readily available FPGA logic, and does not require high-speed circuitry, such as greater than 40 GHz. Further, the precoder can be compact in size. The present invention utilizes a parallel format and readily available multiplexers, such as 16:1 multiplexers.

Figure 1:
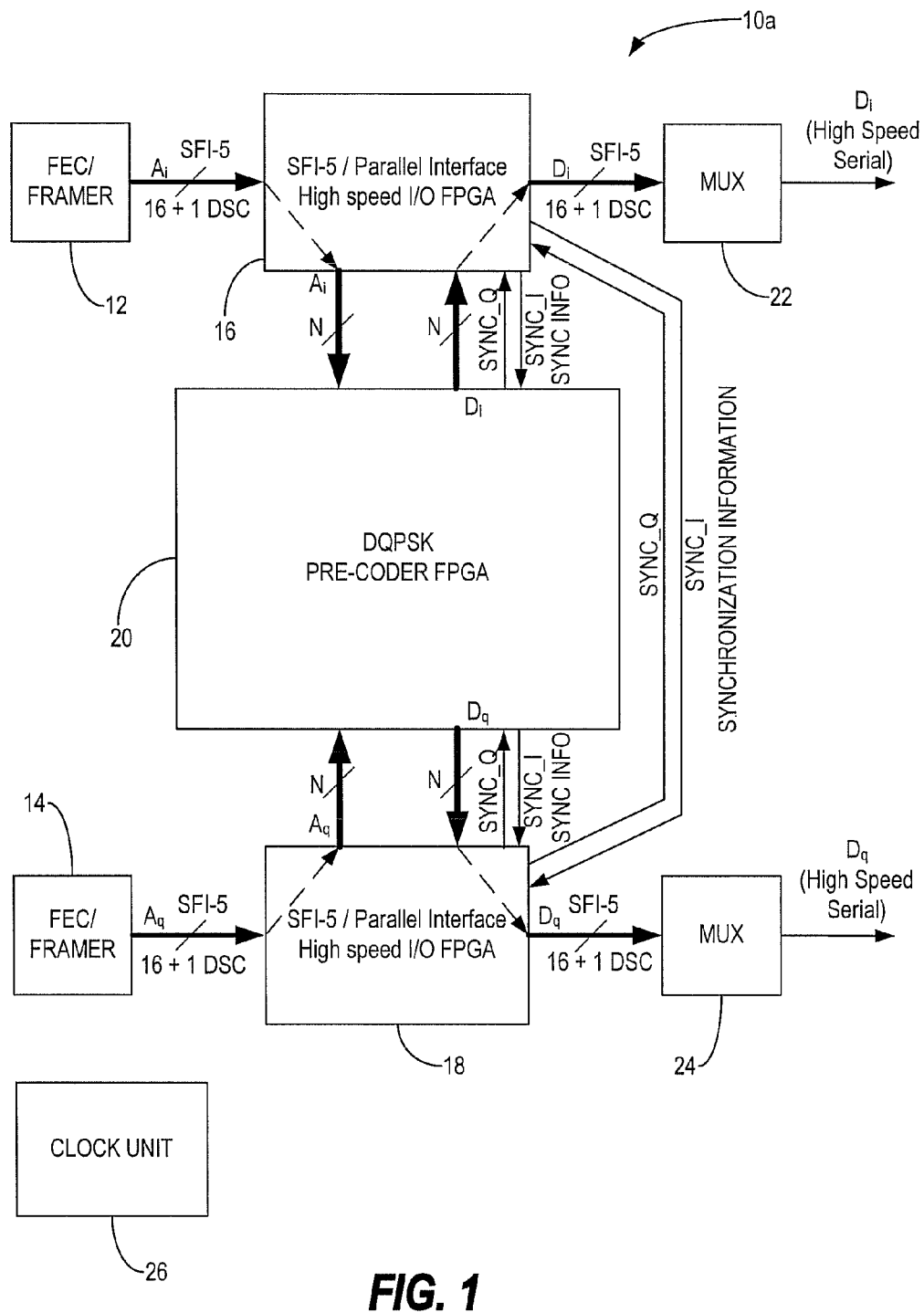
FIG. 1 is a block diagram of a DQPSK parallel precoder using three FPGAs according to an exemplary embodiment of the present invention.

Referring to FIG. 1, in an exemplary embodiment of the present invention, a parallel precoder 10a includes two forward error correction (FEC)/framer circuits 12, 14, two high-speed FPGAs 16, 18, a precoder FPGA 20, two multiplexers 22, 24, and a clock unit 26. The FEC/framer circuits 12, 14 are configured to output two synchronized data streams, $A_i$ and $A_q$, to the high-speed FPGAs 16, 18. The FEC/framer circuits 12, 14 can be configured to provide any output data in standard formats as are known in the art, such as two OC-768s, two STM-256s, two Optical Channel Transport Unit of level 3 (OTU3), two proprietary synchronous data streams, and the like. For example, the SFI-5 interface protocol can be used to divide each of the data streams, $A_i$ and $A_q$, into 16×3.125 Gb/s serial data signals, plus one additional 3.125 Gb/s deskewing channel (DSC), which can be transmitted/received by the FPGAs 16, 18.

The high-speed FPGAs 16, 18 are configured to receive the data streams, $A_i$ and $A_q$, interface the data streams, $A_i$ and $A_q$, to the precoder FPGA 20, and output two precoded data streams, $D_i$ and $D_q$, to the multiplexers 22, 24. For example, the high-speed FPGAs 16, 18 are configured to perform high-speed serializer/de-serializer (SerDes) functionality. Advantageously, the present invention uses three commercially-available FPGA's. The high-speed FPGAs 16, 18 include high-speed I/O interfaces readily available on the market. Each high-speed FPGA 16, 18 is configured to transmit and receive synchronized independent data, such as in an SFI-5 format or the like. In the exemplary embodiment of FIG. 1, each high-speed FPGA 16, 18 accepts sixteen data lines plus one DSC channel from the FEC/framer circuits 12, 14. The high-speed FPGAs 16, 18 are configured to process the data streams, $A_i$ and $A_q$, to a lower data rate, to transmit/receive the data to/from the precoder FPGA 20, and to output data streams, $D_i$ and $D_q$, to the multiplexers 22, 24.

The precoder FPGA 20 is configured to perform encoding and synchronization to convert data streams, $A_i$ and $A_q$, to data streams, $D_i$ and $D_q$ for an optical DQPSK modulation. With regards to data streams, $A_i$ and $A_q$, and data streams, $D_i$ and $D_q$, the indices, i and q, represent the channel. After processing in the FPGAs 16, 18, 20, data streams, $D_i$ and $D_q$, is transferred back to serial data streams by the multiplexers 22, 24. Each channel processing FPGA 16, 18, 20 provides synchronization information to the other channel, i.e., i channel to q, and q to i.

The data streams, $D_i$ and $D_q$, are output from the precoder 10a on two high-speed serial interfaces. For example, these serial interfaces can include a 50 Gb/s SFI-5 interface or the like. The high-speed serial interfaces provide output for serial optical transmission. Conventional serial precoders operate after the two high-speed serial outputs from the serializers (i.e., multiplexers), producing two DQPSK precoded serial outputs that can be used to drive an optical signal transmit modulator. Advantageously, the parallel precoder 10a can operate at a much lower rate than conventional serial precodes which typically operate at a 50 GHz serial rate.

The parallel precoder 10a of the present invention performs the DQPSK pre-coding before the data streams are sent to the multiplexers 22, 24. The parallel precoder 10a operates on many more bits per operation at much less speed per operation. For example, compared to the serial precoder at 2 bits per operation at 50 GHz speed, one realizable exemplary embodiment of the parallel precoder 10a implementation operates on 2048 bits per clock period at approximately 50 MHz clock speed, providing 100 Gb/sec pre-coding.

For example, the precoder 10a can be illustrated in an exemplary 100 Gb/s system with two 50 Gb/s serial input data streams. In this exemplary embodiment, the data flows through the parallel precoder 10a as follows. First, two 50 Gb/s input data streams $A_i$ and $A_q$ are transmitted from the FEC/framers 12, 14 to receive SFI-5 ports on the high-speed FPGAs 16, 18. In this exemplary embodiment, the SFI-5 interfaces are on two separate FPGAs 16, 18 because of limitations that currently available FPGA's only have sufficient Gigabit (Gb) interface blocks to support one SFI-5 interface. Each high-speed FPGA 16, 18 places the data received by the receive SFI-5 interface onto a parallel bus connected to an inter-FPGA parallel interface, N.

The data streams are transmitted from each high-speed FPGA 16, 18 over the inter-FPGA parallel interface, N, to the precoder FPGA 20. Inside the precoder FPGA 20, the data streams $A_i$ and $A_q$ are now received on parallel interfaces, and the parallel data is placed onto a precoder input bus. This bus can be even wider than the parallel interface bus, N, in order for the precoder FPGA 20 time to meet FPGA timing requirements. When a full precoder input bus width of $A_i$ and $A_q$ data streams have been received from the parallel interfaces, N, the precoder input bus is clocked into a precoder input register. This register can be very wide, such as, for example, 2048 bits.

At the same time the $A_i$ and $A_q$ data streams are clocked into the precoder input register, the most recently pre-coded bit pair, for example $D_i(1023)$, $D_q(1023)$, and from the previous pre-coding clock cycle are also clocked into the precoder input register. These are now $D_i(-1)$ and $D_q(-1)$ for the current pre-coding cycle. The $A_i$ and $A_q$ and $D_i(-1)$ and $D_q(-1)$ are processed by the precoder into wide pre-coded data $D_i(0:1023)$ and $D_q(0:1023)$, and at the next precoder clock are registered in the wide precoder output register, for example 2048 bits. The precoder output bus $D_i$ and $D_q$ data streams are sent to transmit parallel interfaces, N. The transmit parallel interfaces, N, send $D_i$ data to $D_i$ SFI-5 FPGA, and send $D_q$ data to $D_q$ SFI-5 FPGA. The high-speed FPGA 16, 18 transmit the precoded $D_i$ and $D_q$ data streams to their respective multiplexers 22, 24.

To provide optimum synchronization, each FPGA 16, 18, 20 shares synchronization information with the others. SYNC_Q provides information on $D_q$ channel synchronization, and SYNC_I provides information on synchronization of $D_i$ channel. The clock unit 26 is configured to provide a single clock source to each of the components in the precoder 10a.

Figure 2:
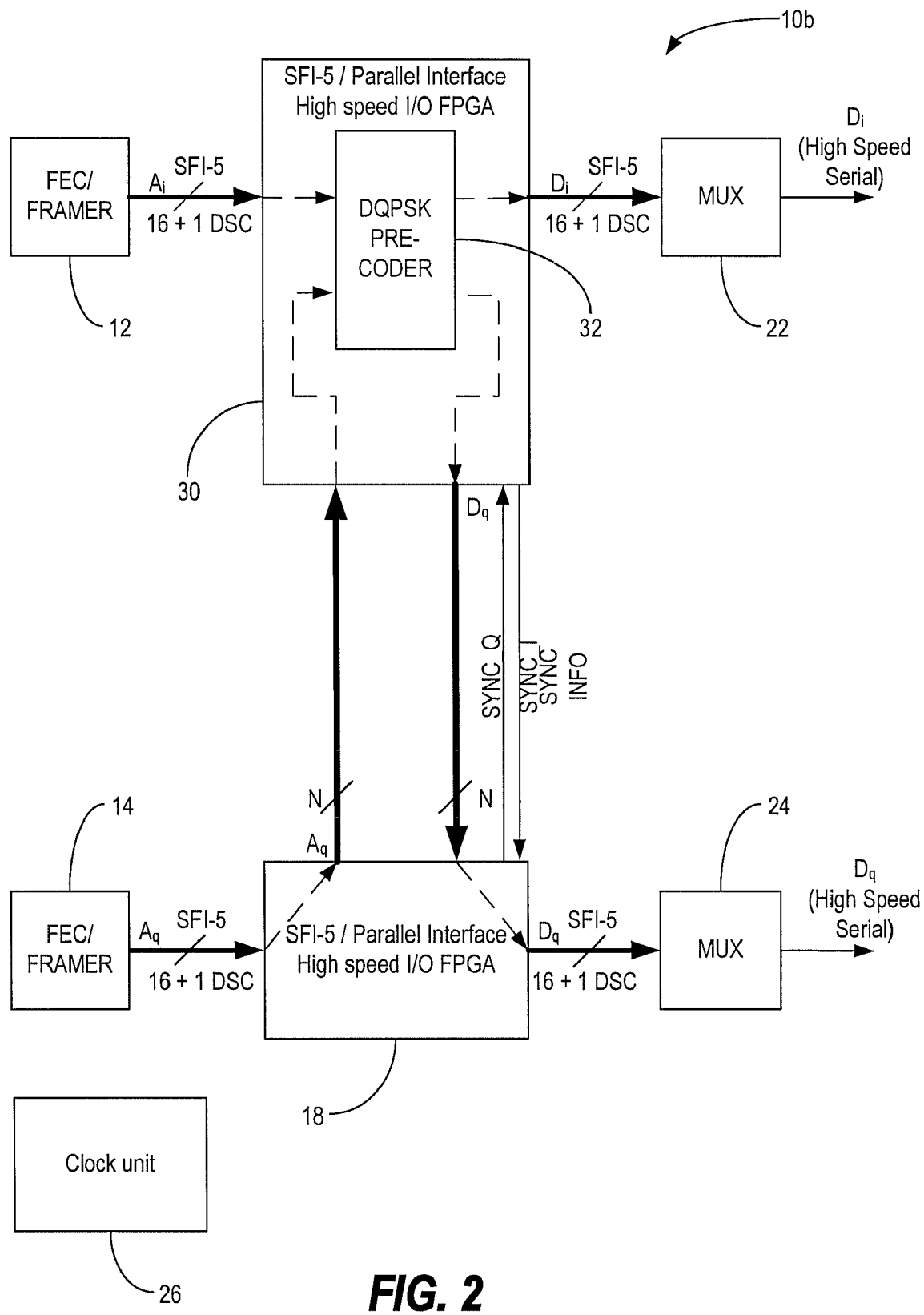
FIG. 2 is a block diagram of a DQPSK parallel precoder using two FPGAs according to another exemplary embodiment of the present invention.

Referring to FIG. 2, in another exemplary embodiment of the present invention, a parallel precoder 10b includes two forward error correction(FEC)/framer circuits 12,14, one high-speed FPGA 18, a precoder/high-speed FPGA 30, two multiplexers 22, 24, and a clock unit 26. The precoder 10b includes similar functionality as the precoder 10a in FIG. 1, but eliminates one of the high-speed FPGAs by combining the functionality into the precoder/high-speed FPGA 30. The precoder/high-speed FPGA 30 includes processing capability for incorporating the high-speed I/O from the FEC/Framer 12 and to the multiplexer 22, and for performing the encoding and synchronization of the precoder FPGA 20 in FIG. 1. The precoder 10b reduces the number of external parallel interfaces, N, needed, saving power and complexity, and FPGA's.

In an exemplary embodiment of the precoder 10b, the FEC/Framers 12, 14 transmit data streams, $A_i$ and $A_q$, to the precoder/high-speed FPGA 30 and the high-speed FPGA 18 through a 16+1 line width bus using a standardized format, such as SFI-5. The precoder/high-speed FPGA 30 and the high-speed FPGA 18 are configured to perform a SerDes functionality on the data streams, $A_i$ and $A_q$. The precoder functionality is contained with a DQPSK precoder 32 located within the precoder/high-speed FPGA 30. The high-speed FPGA 18 transmits and receives data from a parallel interface, N, to the precoder/high-speed FPGA 30. The precoder/high-speed FPGA 30 does not need to transmit data $A_i$ since the precoder 32 is located within the FPGA 30.

Following encoding and synchronization in the DQPSK precoder 32, data streams, $D_i$ and $D_q$, are transmitted to the multiplexers 22, 24 through a 16+1 line width bus using a standardized format, such as SFI-5. The data streams, $D_i$ and $D_q$, are output from the precoder 10b on two high-speed serial interfaces for serial optical communication.

Figure 3:
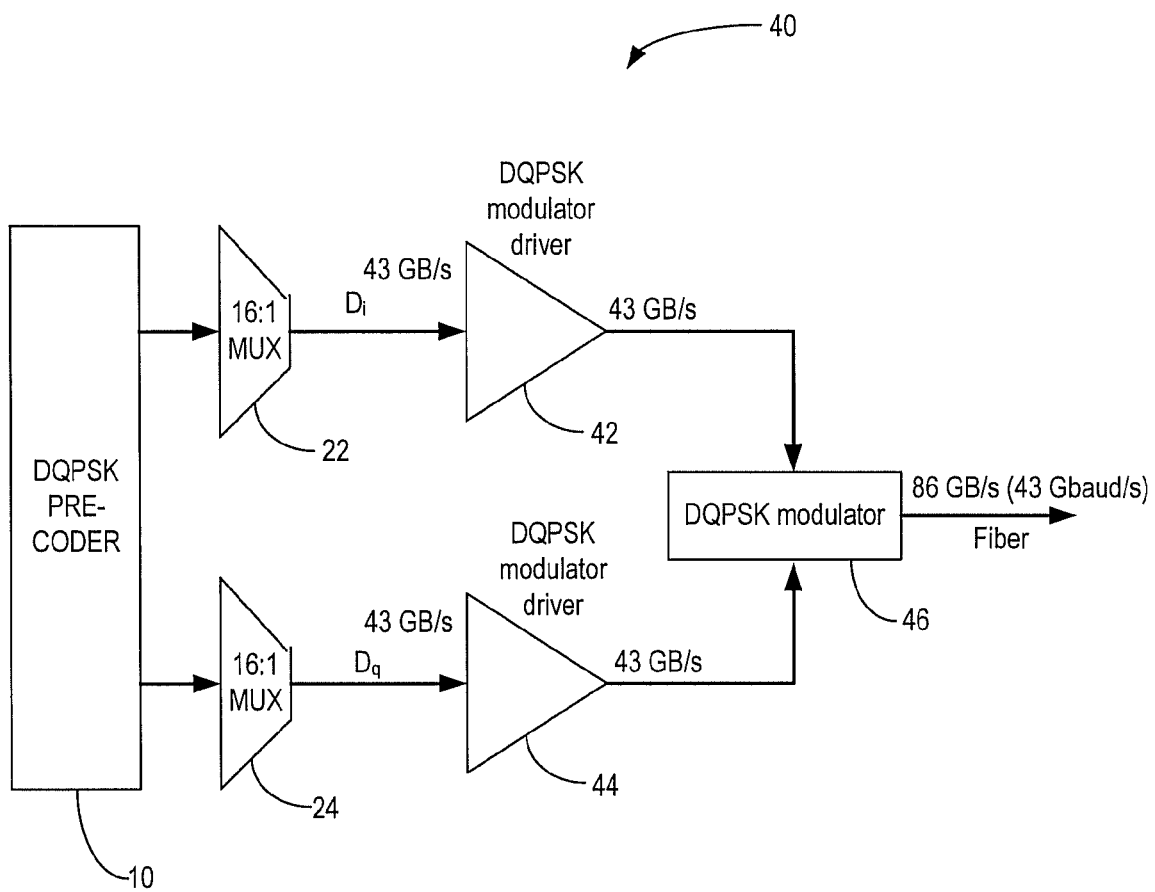
FIG. 3 is a block diagram of a DQPSK transmission according to another exemplary embodiment of the present invention.

Referring to FIG. 3, a block diagram of a DQPSK optical transmitter 40 is illustrated using the DQPSK parallel precoder according to an exemplary embodiment of the present invention. The DQPSK optical transmitter 40 includes a DQPSK precoder 10, 16:1 multiplexers 22, 24, DQPSK modulator drivers 42, 44, and a DQPSK modulator 46. The DQPSK precoder 10 includes two or three FPGAs as described herein configured to performed parallel precoding of two synchronized independent data streams. The DQPSK precoder 10 outputs parallel data streams of precoded data to the multiplexers 22, 24. The mulitplexers 22, 24 are configured to serialize the parallel data streams.

The serialized data streams, $D_i$ and $D_q$, are each input into one of the DQPSK modulator drivers 42, 44. The DQPSK modulator drivers 42, 44 are configured to drive the DQPSK modulator 46 responsive to the serialized data streams, $D_i$ and $D_q$. The DQPSK optical transmitter 40 is shown as an exemplary 86 Gb/s transmitter with the precoder 10 and the multiplexers 22, 24 providing the serialized data streams, $D_i$ and $D_q$, at 43 Gb/s. The DQPSK modulator 46 receives inputs from both of the DQPSK modulator drivers 42, 44 and provides a single 86 Gb/s signal (at a rate of 43 Gbaud/s). Those of ordinary skill in the art will recognize that the DQPSK optical transmitter 40 can be at any high-speed rate, such as 100 Gb/s (50 Gbaud/s) and the like.

Figure 4:
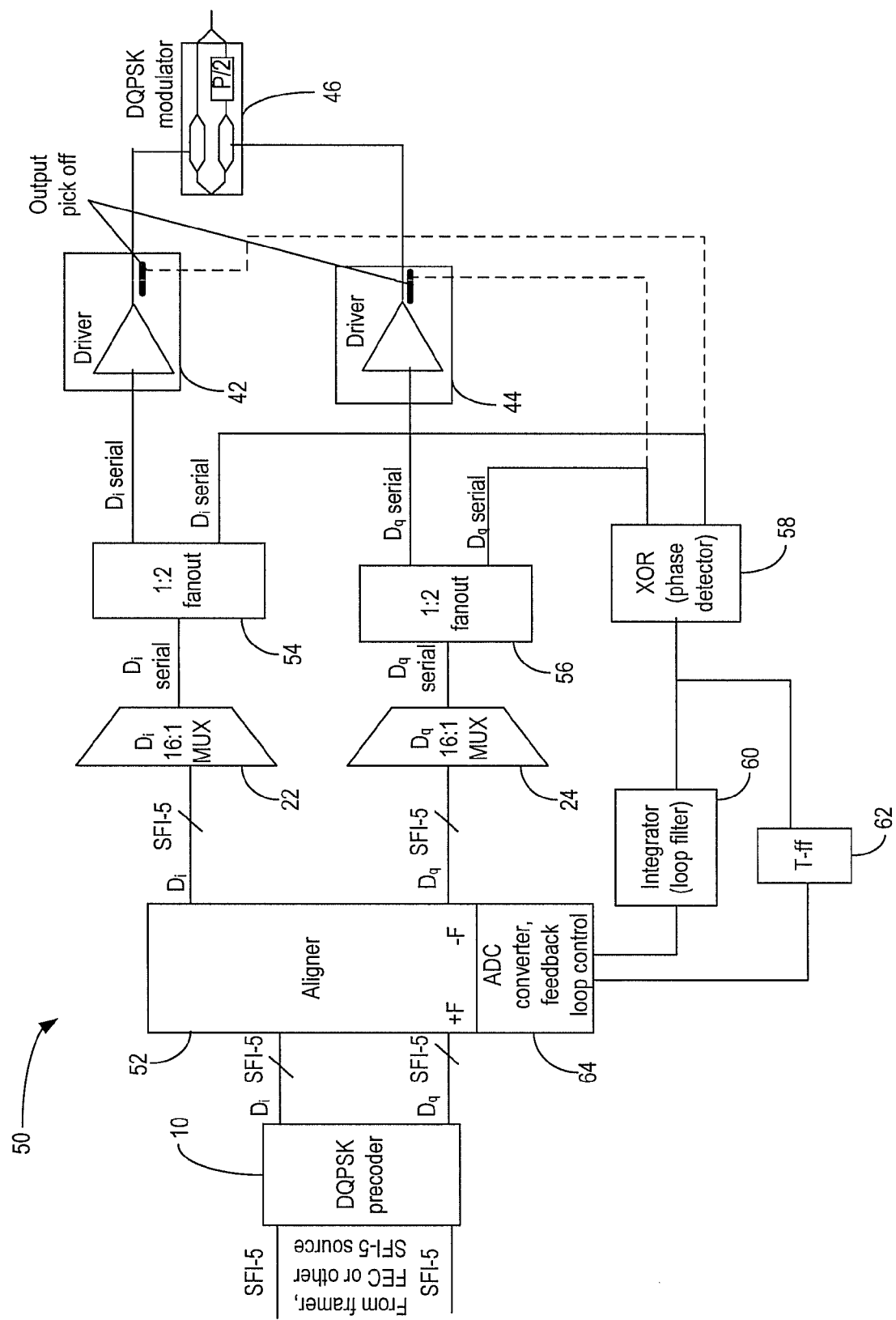
FIG. 4 is a detailed block diagram of an optical transmitter using the DQPSK parallel precoder according to another exemplary embodiment of the present invention.

Referring to FIG. 4, a detailed block diagram of an optical transmitter 50 using a DQPSK parallel precoder 10 is illustrated according to an exemplary embodiment of the present invention. The optical transmitter 50 includes an alignment circuit 52, multiplexers 22, 24, fanouts 54, 56, modulator drivers 42, 44, a modulator 46, a XOR phase detector 58, an integrator 60, a flip-flop 62, and a control circuit 64. The optical transmitter 50 is configured to receive two serial independent data streams from a framer, FEC circuit, or other source, such as an SFI-5 source.

As described herein, the DQPSK precoder 10 encodes and synchronizes two independent data streams for modulation in the DQPSK format. The precoder 10 outputs two parallel data streams, $D_i$ and $D_q$, into the alignment circuit 52. The alignment circuit 52 is configured to perform feedback control for alignment of the parallel and serial data streams, $D_i$ and $D_q$. The alignment circuit 52 outputs realigned parallel data streams, $D_i$ and $D_q$, into the two multiplexers 22, 24 to convert the parallel data streams into serial streams. For example, the interfaces to the precoder 10, the alignment circuit 52, and the multiplexers 22, 24 can include an SFI-5 interface or the like.

The multiplexers 22, 24 are configured to serialize the parallel data streams into serial streams, $D_i$ serial and $D_q$ serial. For example, each multiplexer can include a 16:1 multiplexer configured to perform a conversion of SFI-5 parallel data into serial high-speed format, such as, for example, 53.5 Gb/s. Each of the serial data streams, $D_i$ serial and $D_q$ serial, is output to the 1:2 fanouts 54, 56 with specified deskew between the two outputs. Serial data streams $D_i$ and $D_q$ are output through the modulator drivers 42, 44 to the DQPSK modulator 46.

Other outputs from each fanout are fed to the XOR phase detector 58. The XOR phase detector 58 is an XOR gate working as phase detector. The output of XOR is fed to the integrator 60 (i.e., loop filter) and then to an analog-digital converter (ADC) in the control and alignment circuit 52. The feedback control provides a control signal to the alignment circuit 52 which align two data streams $D_i$ and $D_q$ relative to the total alignment between two serial data $D_i$ serial and $D_q$ serial. The T-flip flop 62 provides additional information about $D_i$ serial alignment with $D_q$ serial data.

The alignment circuit 52 is configured to process feedback info from the XOR phase detector 58 and moves $D_q$ relatively to $D_i$ until the data is in phase. During this operation, the T-FF 62 toggles. The T-FF 62 toggles until the time difference between the two bits at a high data rate does not force the T-FF 62 to toggle. This time realignment control circuit forces data from the precoder 10 to the multiplexers 22, 24. This accomplishes a phase lock between the two data streams $D_i$ serial and $D_q$ serial. If the drivers 42, 44 include a pickoff from the output, then these signals from both drivers 42, 44 can be fed to the XOR phase detector 58 through connections shown by the dashed lines. In this configuration, it is not necessary to utilize the 1:2 fanouts 54, 56.

Advantageously, the present invention allows the use of a parallel data format from framers and the precoder 10 with readily available 16:1 multiplexers and other circuits for DQPSK high-speed (100 Gb/s) data transmission. The automatic realignment of data streams in the optical transmitter 50 opens the door to the realization of long haul transmission at high data rate.

Figure 5:
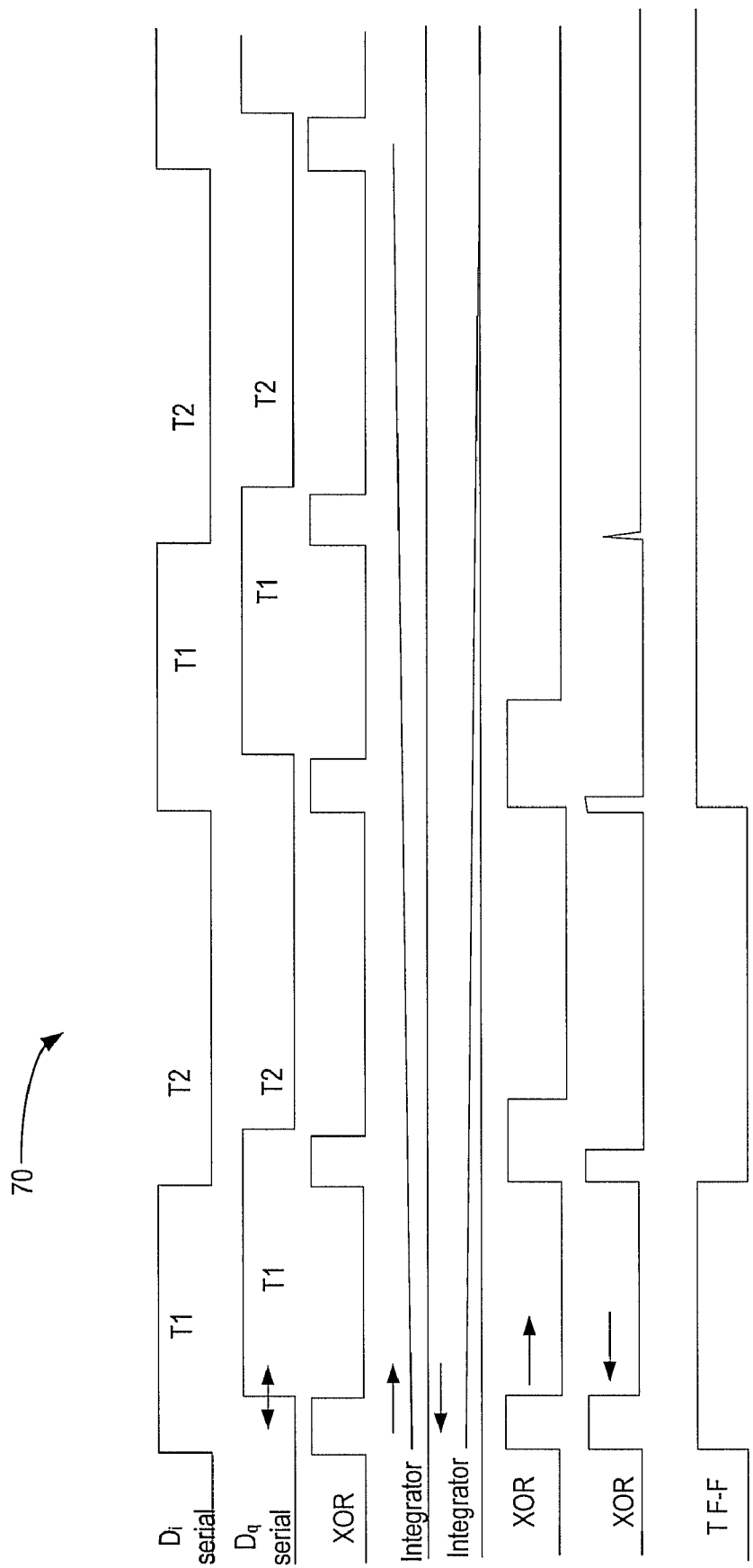
FIG. 5 is a timing diagram for a training signal for DQPSK data stream realignment according to another exemplary embodiment of the present invention.

Referring to FIG. 5, a timing diagram 70 illustrates the timing relationship between the components in the optical transmitter of FIG. 4 for training the DQPSK data streams during the realignment process with the alignment circuit of FIG. 4. The alignment circuit processes feedback from the XOR phase detector using the integrator and T-FF and accordingly moves $D_q$ relative to $D_i$ until both are in phase. Initially (e.g., during power on, power glitch, absence of bit alignment, any dynamic changes, and the like), the precoder sends streams of ones and zeroes generated at precoder, i.e. as shown by the $D_i$ serial and $D_q$ serial diagrams. T1 is a duration of a one state during the realignment process, and T2 is a duration of a zero state during the realignment process. In an exemplary embodiment, T1 is set less than T2 to distinguish between the two time frames.

The duration of the one state is equal to $T1 \gg \tau1$ where T1 is equal to N bits of serial data (for example, for 50 Gbs and N=900; T1=900×20 ps=1.8 ns), and where $\tau1$ is the bit duration at the high data rate (e.g., at 50 Gb/s, the bit duration is equal to 20 ps.). The duration of the zero state equal to M bits of high-speed data rate (for example for 50 Gb/s and M=1200; T2=1500×20 ps=3 ns) with M>N. The value of T1 equals N×$\tau1$ and the value of T2 equals M×$\tau1$. The duration of T1 is chosen from the assumption that $D_i$ serial and $D_q$ serial deskew in this format with any delay between channels after two MUX's will be inside of time of T1.

The alignment circuit and corresponding realignment process are configured to operate at an initial state through a training signal and during operation providing feedback control. FIG. 5 illustrates the timing diagram 70 for an exemplary training signal. First, T1 and T2 are selected as described herein. Each of the data streams, $D_i$ serial and $D_q$ serial, transmit ones and zeros for T1 and T2 time periods, respectively. The timing diagram 70 shows that $D_i$ serial and $D_q$ serial are initially slightly out-of-phase. Accordingly, the XOR in the alignment circuit is high. The output of the XOR is provided both to the integrator and the T-FF, and both the outputs of the integrator and T-FF are provided to an ADC converter/feedback loop control circuit.

The ADC converter/feedback loop control circuit is configured, responsive to feedback from the integrator and T-FF, to move the $D_q$ serial relative to $D_i$ serial to ensure both are in phase. Effectively, the integrator controls the direction of movement, and the T-FF controls whether the process is complete providing a phase lock between $D_i$ serial and $D_q$ serial.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A parallel precoder and alignment circuit, comprising:
   precoding circuitry configured to process a first and second high-speed data stream;
   a first field programmable gate array comprising a first high-speed input/output interface configured to:
   receive the first high-speed data stream;
   process the first high-speed data stream to a lower rate;
   transmit the first high-speed data stream to the precoding circuitry;
   receive the processed first high-speed data stream; and
   transmit the processed first high-speed data stream to a first multiplexer;
   a second field programmable gate array comprising a second high-speed input/output interface configured to:
   receive the second high-speed data stream;
   process the second high-speed data stream to a lower rate;
   transmit the second high-speed data stream to the precoding circuitry;
   receive the processed second high-speed data stream; and
   transmit the processed second high-speed data stream to a second multiplexer;
   a clock unit configured to provide timing to the precoding circuitry, the first field programmable gate array, and the second field programmable gate array; and
   an alignment circuit configured to receive the precoded first and second high-speed data streams from the precoding circuitry;
   wherein the alignment circuit is configured to phase lock the first and second high-speed data streams.

2. The parallel precoder circuit of claim 1, wherein configured to process the first and second high-speed data stream comprises encoding and synchronization for a differential quadrature phase shift keying modulation format.

3. The parallel precoder circuit of claim 1, wherein the precoding circuitry comprises a third field programmable gate array connected to the first and second field programmable gate array through a parallel interface.

4. The parallel precoder circuit of claim 1, wherein the precoding circuitry is located within the first field programmable gate array, and wherein the second field programmable gate array is connected to the first field programmable gate array through a parallel interface.

5. The parallel precoder circuit of claim 1, further comprising a first and second interface connected to the first field programmable gate array, wherein the first high-speed data stream is received on the first interface and transmitted to the first multiplexer on the second interface; and
   a third and fourth interface connected to the second field programmable gate array, wherein the second high-speed data stream is received on the third interface and transmitted to the second multiplexer on the third interface.

6. The parallel precoder circuit of claim 5, wherein the first, second, third, and four interfaces each utilize a SerDes Framer Interface Level 5 format.

7. The parallel precoder circuit of claim 5, wherein the first, second, third, and four interfaces each comprise sixteen by 3.125 Gb/s serial data signals and one 3.125 Gb/s deskewing channel.

8. The parallel precoder circuit of claim 1, wherein the first and second high-speed data stream comprise one of an OC-768, STM-256, Optical Channel Transport Unit of Level 3, and a proprietary high-speed synchronous signal.

9. A Differential Quadrature Phase Shift Keying optical transmitter, comprising:
   a parallel precoder configured to receive a first and second high-speed data stream, and to encode and synchronize the first and second high-speed data stream for Differential Quadrature Phase Shift Keying modulation;
   an alignment circuit configured to receive the precoded first and second high-speed data streams from the parallel precoder;
   a first and second multiplexer, wherein the first multiplexer is configured to receive the first precoded high-speed data stream from the alignment circuit, and the second multiplexer is configured to receive the second precoded high-speed data stream from the alignment circuit;
   a first and second Differential Quadrature Phase Shift Keying modulator driver, wherein the first Differential Quadrature Phase Shift Keying modulator driver is configured to receive the first multiplexed high-speed data stream, and the second Differential Quadrature Phase Shift Keying modulator driver is configured to receive the second multiplexed high-speed data stream; and
   a Differential Quadrature Phase Shift Keying modulator configured to modulate an optical signal responsive to outputs from the first and second Differential Quadrature Phase Shift Keying modulator drivers;
   wherein the alignment circuit is configured to phase lock the first and second high-speed data streams.

10. The Differential Quadrature Phase Shift Keying optical transmitter of claim 9, wherein the alignment circuit comprises:
    a first fanout located between the first multiplexer and the first Differential Quadrature Phase Shift Keying modulator driver, wherein the first fanout is configured to split the first multiplexed high-speed data stream to both the first Differential Quadrature Phase Shift Keying modulator driver and an Exclusive OR phase detector;
    a second fanout located between the second multiplexer and the second Differential Quadrature Phase Shift Keying modulator driver, wherein the second fanout is configured to split the second multiplexed high-speed data stream to both the second Differential Quadrature Phase Shift Keying modulator driver and the Exclusive OR phase detector;
    an integrator connected to the output of the Exclusive OR phase detector;
    a T-Flip Flop connected to the output of the Exclusive OR phase detector;
    a feedback loop control circuit configured to receive the output of integrator and the T-Flip Flop; and
    an aligner connected to the parallel precoder and the first and second multiplexer, wherein the aligner is configured to control the flow of the first and second high-speed data streams responsive to feedback control with the integrator, T-Flip Flop, and the feedback loop control circuit.

11. The Differential Quadrature Phase Shift Keying optical transmitter of claim 9, wherein the alignment circuit comprises:
    a first output pick-off on the first Differential Quadrature Phase Shift Keying modulator driver, wherein the first output pick-off is sent to an Exclusive OR phase detector;
    a second output pick-off on the second Differential Quadrature Phase Shift Keying modulator driver, wherein the second output pick-off is sent to the Exclusive OR phase detector;
    an integrator connected to the output of the Exclusive OR phase detector;
    a T-Flip Flop connected to the output of the Exclusive OR phase detector;
    a feedback loop control circuit configured to receive the output of integrator and the T-Flip Flop; and
    an aligner connected to the parallel precoder and the first and second multiplexer, wherein the aligner is configured to control the flow of the first and second high-speed data streams responsive to feedback control with the integrator, T-Flip Flop, and the feedback loop control circuit.

12. The Differential Quadrature Phase Shift Keying optical transmitter of claim 9, wherein the alignment circuit is configured to operate a training signal to initially set a phase lock between the first and second high-speed data stream.

13. The Differential Quadrature Phase Shift Keying optical transmitter of claim 9, wherein the parallel precoder comprises:
    precoding circuitry configured to process the first and second high-speed data stream;
    a first field programmable gate array comprising a first high-speed input/output interface configured to:
    receive the first high-speed data stream;
    process the first high-speed data stream to a lower rate;
    transmit the first high-speed data stream to the precoding circuitry;
    receive the processed first high-speed data stream; and
    transmit the processed first high-speed data stream to the alignment circuit;
    a second field programmable gate array comprising a second high-speed input/output interface configured to:
    receive the second high-speed data stream;
    process the second high-speed data stream to a lower rate;
    transmit the second high-speed data stream to the precoding circuitry;
    receive the processed second high-speed data stream; and transmit the processed second high-speed data stream to the alignment circuit;

a clock unit configured to provide timing to the precoding circuitry, the first field programmable gate array, and the second field programmable gate array.

14. The Differential Quadrature Phase Shift Keying optical transmitter of claim 9, wherein the first and second high-speed data stream comprise one of an OC-768, STM-256, Optical Channel Transport Unit of Level 3, and a proprietary high-speed synchronous signal.

15. The Differential Quadrature Phase Shift Keying optical transmitter of claim 9, wherein the parallel precoder, the alignment circuit, and the first and second multiplexer communicate utilizing a SerDes Framer Interface Level 5 format.

16. A parallel precoding and high-speed data stream realignment method for a Differential Quadrature Phase Shift Keying optical transmitter, comprising:

receiving a first and second high-speed data stream;

processing the first and second high-speed data streams to a lower rate;

encoding the first and second high-speed data streams;

synchronizing the first and second high-speed data streams;

serializing the first and second high-speed data streams;

monitoring phase differences between the serialized first and second high-speed data streams; and adjusting one of the first and second high-speed data streams responsive to phase differences to achieve a phase lock between the serialized first and second high-speed data streams.

17. The parallel precoding and high-speed data stream realignment method of claim 16, further comprising:

driving a Differential Quadrature Phase Shift Keying modulator with the phase adjusted serialized first and second high-speed data streams.

18. The parallel precoding and high-speed data stream realignment method of claim 16, further comprising:

automatically realigning the serialized first and second high-speed data streams responsive to phase differences.

19. The parallel precoding and high-speed data stream realignment method of claim 16, wherein the receiving, processing, encoding, and synchronizing steps are performed by a parallel precoder comprising field programmable gate arrays with high-speed input/output interfaces;

wherein the serializing step is performed by multiplexers; and wherein the monitoring and adjusting steps are performed by an alignment circuit comprising a feedback loop.

* * * * *